May 10, 1927.
E. T. FERNGREN
1,628,238
MOLTEN GLASS FEEDING MECHANISM
Filed Feb. 23, 1912
2 Sheets-Sheet 1
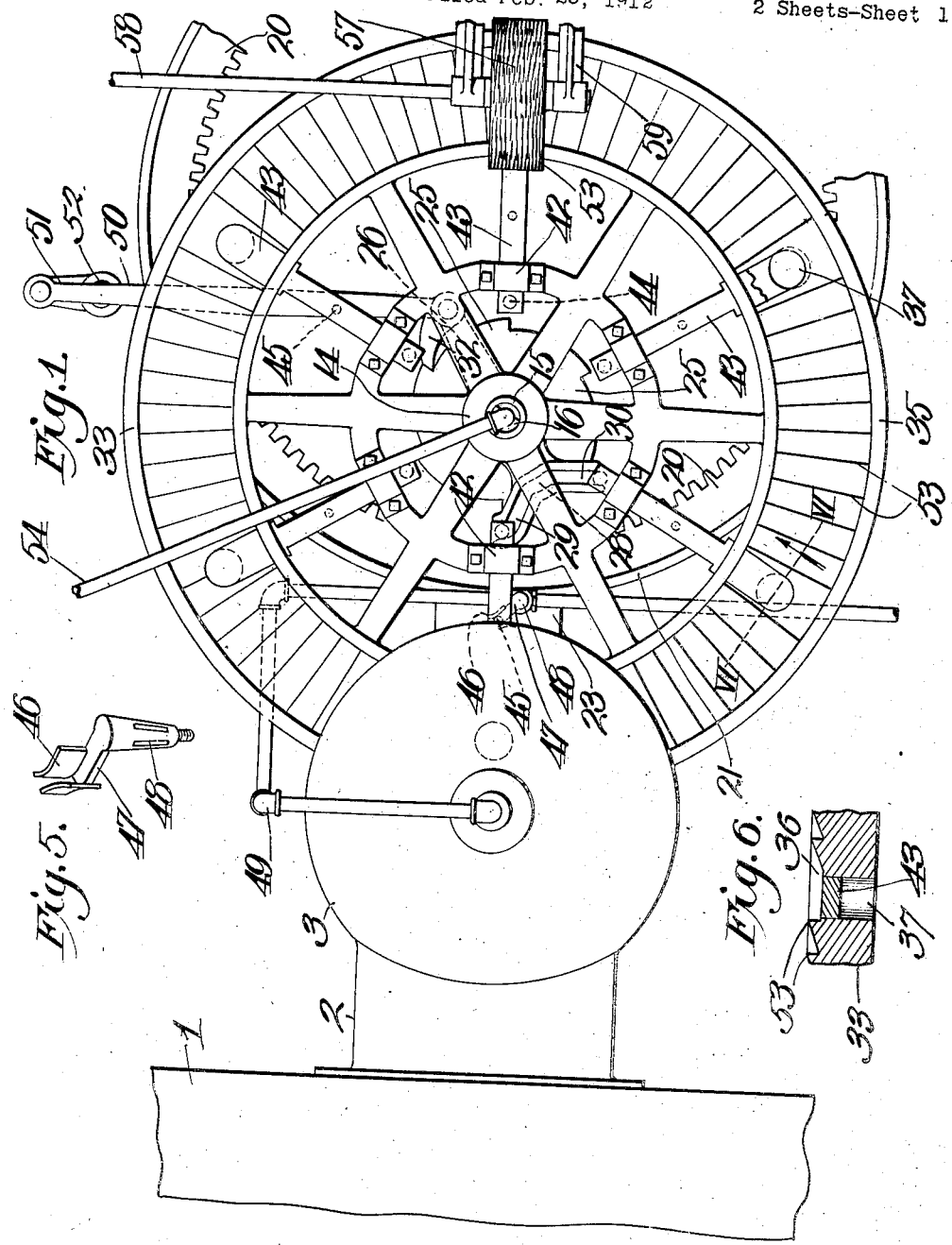

May 10, 1927.
E. T. FERNGREN
1,628,238
MOLTEN GLASS FEEDING MECHANISM
Filed Feb. 23, 1912
2 Sheets-Sheet 2
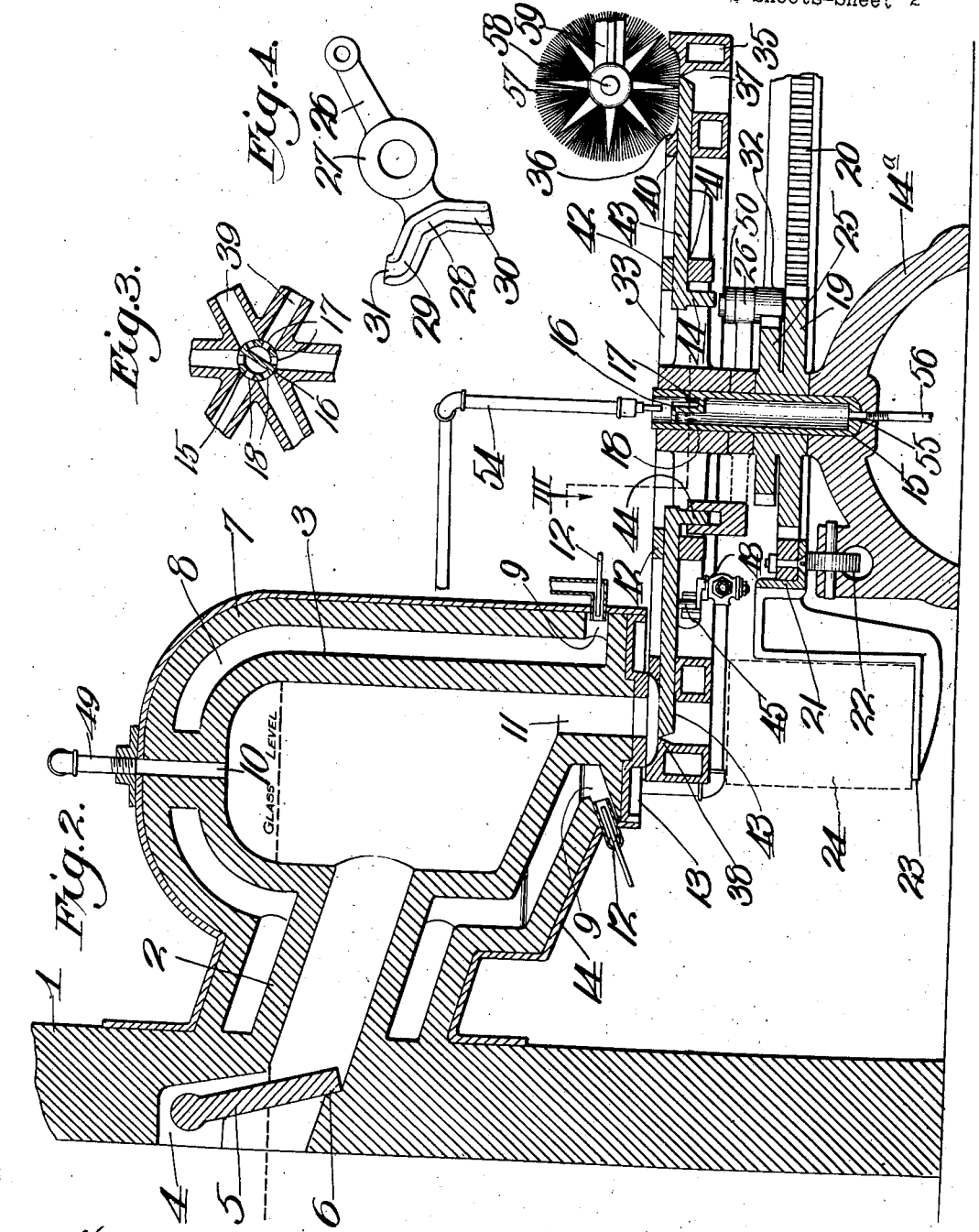
Witnesses
Frank R. Glon
H. C. Rodgers
Inventor
E. T. Ferngren
By George Y. Thorpe Atty.

Patented May 10, 1927.

1,628,238

UNITED STATES PATENT OFFICE.

ENOCH T. FERNGREN, OF TOLEDO, OHIO.

MOLTEN-GLASS-FEEDING MECHANISM.

Application filed February 23, 1912. Serial No. 679,236.

This invention relates to molten glass feeding mechanism and more especially to mechanism of that character in which a fluid under pressure is utilized to effect the discharge of molten glass from a crucible into a mold, and my object is to produce mechanism of this character whereby the issuance of the molten glass from the crucible spout is continued, while being retarded or limited at the intervals between discharges from the crucible into the molds, for the purpose of keeping the glass in motion and thereby insuring an operative condition and flow of the molten glass when charging the molds.

With this general object in view and others of a secondary character, the invention consists in certain novel and peculiar features of construction and organization as hereinafter described and claimed; and in order that it may be fully understood reference is to be had to the accompanying drawings, in which—

Figure 1, is a top plan view of a molten glass feeding mechanism embodying my invention.

Figure 2, is a central vertical section of the same.

Figure 3, is a section on dotted line III of Figure 2.

Figure 4, is a plan view of a lever and cam movable therewith forming part of the mechanism.

Figure 5 is a detail perspective view of a three-way valve forming a part of the invention.

Figure 6, is a section on line VI—VI of Figure 1.

In the said drawings, 1 is a part of a glass furnace, 2 is a tube extending downwardly and outwardly from the furnace in the plane of the level of the glass, and 3 is a crucible into which said tube leads.

At the receiving end of the tube, the furnace wall is provided with an opening 4, wherein is pivotally mounted, a check valve 5, which when closed rests against a shoulder 6. 7 is a casing completely enclosing the crucible and neck 2, and spaced therefrom to provide a chamber 8, surrounding the crucible for the purpose of heating the same and the glass which stands normally in the crucible at the same level as in the furnace, and said casing is provided with one or more openings 9 at its lower end. The crucible is provided above the glass level with a passage 10, and at its lower end is provided with a discharge spout 11, upon which spout a flame from burners projecting into openings 9 shall impinge for the purpose of heating chamber 8, and superheating the spout 11.

At its bottom the crucible is provided with a plate 13, and the casing is enclosed by a shell 14, to guard against crumbling of the crucible and casing should the same be of material liable to crumble or to injury through the impact thereon of any hard object.

14$^a$ is a stand, and socketed at its lower end in said stand and adapted to turn thereon is a hollow shaft 15 provided at its upper end with a step-shaped partition 16, and at opposite sides of said partition with discharge apertures 17 and receiving apertures 18, for a purpose which hereinafter appears.

Rigidly secured on the shaft and resting on said stand is a gear wheel 19 meshing with the internal-toothed gear wheel 20, provided with a peripheral flange 21, adapted to be supported upon an anti-friction roll 22, carried by the stand, and additionally supported in any suitable manner, and secured on said flange 21 at equal distances from each other is a plurality of hangers 23, one only appearing, and each hanger constitutes a support for a mold as indicated by dotted lines 24, the parts being so proportioned and arranged that with each intermittent movement of the gear 20, as hereinafter appears, a mold will be disposed vertically below the spout 11 of the crucible.

25 is a ratchet wheel rigid with gear wheel 19 and provided with teeth corresponding in number to the hangers 23, and 26 is a lever provided with a hub 27 journaled on the hollow shaft and resting on ratchet wheel 25. At its heel end the lever is provided with a cam groove consisting of a short central portion 28 extending substantially concentrically of the axis of the lever and outwardly diverging portions 29 and 30, the receiving end of portion 29 terminating in a flaring mouth 31, for a purpose which hereinafter appears.

At its opposite end the lever pivotally carries a pawl 32, engaging the ratchet wheel 25. Rigidly secured on shaft 15 is a wheel 33, consisting of an inner segment portion 34, comprising a hub, spokes radiating therefrom and cross pieces connecting the spokes, and an outer hollow rim 35, provided with a channel 36 in its upper side having radial ribs 53 and with a series of vertical ports 37 communicating at their upper ends with the channel. The ports correspond in number to the ratchet teeth and are disposed preferably in the radial plane thereof, the outer halves of the upper margins of the ports being given a V or knife-edge shape as at 38, for a purpose which hereinafter appears.

The spokes of the wheel are provided with bores or passages 39, a number of which establish communication between the hollow rim and the discharge openings 17 of shaft 15, and the remainder between the hollow rim and the receiving openings 18 of said shaft, for a purpose which hereinafter appears.

The wheel is also provided with openings 40, and guideways 41, in radial alinement with the ports 37, and the guide-ways 41 are bridged by keepers 42 secured to the wheel. Fitting slidingly in the alined guideways and openings and retained in the former by the keepers are reciprocatory cut-offs 43, which normally close the upper ends of the ports 37. Each of said cut-offs in closing, cooperates with the companion knife edge 38 in cleanly cutting a body of molten glass passing from the crucible spout through the port, as hereinafter more particularly referred to, and each cut off is provided at its inner end with a depending pin 44, which is adapted once in each revolution of the wheel, to pass through the cam groove of the lever 26, for the purpose of opening and closing the cut-off. Each cut-off is also provided with a depending pin 45 for engagement once in each revolution, with a cam groove 46 of the handle 47 of a three-way valve 48, controlling a pipe 49 communicating at its upper end with a passage 10, of the crucible, the arrangement being such that the pin of the cut-off vertically below the spout of the crucible shall enter the cam groove 46 and under the opening movement imparted to the cut-off by the portion 29 of the cam groove of lever 26, shall operate said valve and permit air or other proper fluid under pressure to pass through pipe 49 to passage 10 into the crucible for the purpose of forcing glass therefrom through the spout, and the alined or uncovered port into the mold below the same, the parts being so proportioned that the cut-off is almost completely opened before the air is enabled to pass through the valve in order to prevent the ejection of the glass under the pressure imposed thereon by the air from accumulating in any material quantity on the outer end of the cut off.

After each discharge of glass from the crucible spout, the pocketed entrance to the port in the conveyor wheel is more or less covered with glass, which is integral with the projected rod of glass reaching from the spout to the mold, and by means of the cut-off the said rod is severed at a point away from the end of said spout, without producing any chilling effect upon the glass in the spout, thus obviating the chilling effect attending cut-off means operating close to the edge of the spout.

In cutting across the port opening, the induced movement of the glass rod from the spout is arrested, and a bottom is afforded to the port pocket which will support the severed end of the glass issuing from the spout, thereby momentarily retarding the gravity flow, previous to further movement of the wheel for conveyor purposes. The continued retarding of the gravity flow, between successive positioning of the ports in register with the spout, is afforded by the proximity of the moving carrier surface beneath the spout; the serrations acting to insure a positive carrying off of the glass during this movement of the carrier.

Although the conveyor wheel is illustrated in Figure 2, as having the edges of the serrations positioned close to the spout end, it will be found advisable at times, to have more or less space there between to adapt the device to the conditions of flow manifested by the glass as it issues from the crucible spout. This spacing, in conjunction with the speed of the carrier, between successive positioning of the ports as well as the fluidic consistency of the glass, regulates and determines the amount of glass deposited upon the carrier surface.

The valve remains opened through the continued engagement of the pin of the cut-off with the cam groove 46, during the engagement of the pin 44 with the concentric portion 28 of the cam groove of the lever and is reclosed as the pin 44 travels outwardly in portion 30 of the cam groove of the lever, it being understood that most of the movement of the valve is on lap and hence it is opened quickly just before the pin 44 passes from the cam groove portion 29 into cam groove portion 28 and recloses almost instantly after the pin 44 enters cam groove portion 30.

For imparting intermittent movement to the wheel, a link 50, is pivotally connected to the lever coincidentally with the connection of the latter and the pawl, the opposite end of said link being pivoted to the crank arm 51 of a suitably driven shaft 52. With each revolution of said shaft the pawl is advanced and retracted. In its advance movement it turns the wheel one step, that is to say, moves one port from under the spout and the next port under the spout of the crucible. On its opposite movement, the pawl slips over a tooth and into engagement with the following tooth of the ratchet wheel and during this resetting movement of the pawl the grooved portion of the lever through engagement with the pin 44 of the cut-off of the port underlying the spout withdraws said cut-off and opens the valve 48 and recloses said valve and readvances the cut-off as hereinbefore explained.

The glass flows continuously from the spout of the crucible under the force of gravity and the wheel underlying the spout receives such glass and carries it away at a speed proportionate to its flow for the purpose of preventing a body of glass accumulating at the lower end of the spout and congealing to such an extent as to interfere with its proper flow from the crucible, it being understood that through this movement of the glass and the intermittent movement of the wheel, the glass will be spread out in the channel and congeal almost instantly after contact with the wheel. It will be further noted that by providing the wheel with serrations or teeth it will obtain a grip on the molten glass issuing from the spout and thus more positively and effectually carry off the lower or congealing end of the stream, to the end that it shall have no tendency to cause the glass in the spout to congeal, which as hereinbefore explained is maintained at the required temperature, by the impingement of the flame from the burners on the spout.

In order to quickly chill and congeal glass upon the wheel a water supply pipe 54 communicates at its discharge end with the upper end of the hollow shaft, which water circulates outwardly through opening 17 and the spokes communicating therewith into the hollow rim, and from the latter through the remaining spokes and openings 18, into the lower portion of said shaft and thence through an opening 55 into a waste pipe 56 depending from the stand 14ª. For the purpose of effecting the removal of the chilled glass from the channel an abrasion or scraping wheel 57 of steel or other suitable material is disposed at a suitable point to operate within the channel and is shown in Figures 1 and 2, said wheel being mounted on a suitably driven shaft 58, journaled in suitably supported bearings 59.

As the operation of the various parts of the mechanism have been described in detail, the general operation briefly, is as follows; movement is imparted through any suitable means not shown, to shafts 52 and 58, the operation of the former through the connections described, imparting step by step movement to the conveyor wheel for the purpose of successively disposing the ports thereof vertically below the spout of the crucible and simultaneously disposing molds vertically below said ports. In the interim between the movements of the wheel, the pawl is moved back or reset to effect the ensuing movement of the wheel, and in such resetting operation the lever 26 is operated to effect the opening and closing movement of the cut-off for the port at that time below the crucible spout, the opening movement of such cut-off opening the valve of the air pipe, and the closing movement of the cut-off reclosing such valve, the described actions being repeated indefinitely, it being noted that the intermittent rotation of the conveyor wheel is transmitted to the mold-carrying wheel through the intermeshed relation existing between gear wheel 19 and said mold-carrying wheel, and that during the entire operation of the mechanism the conveyor wheel is maintained at a comparatively low temperature through the circulation of water supplied by pipe 54 and discharged by waste pipe 56, the waste glass which congeals upon the conveyor wheel being scraped therefrom by the wheel 57 mounted on the continuously driven shaft 58.

It will be observed, as the level of the glass in the crucible is the same as that in the furnace as indicated by the dotted line, Figure 2, that the supply of glass in the crucible is replenished automatically after each discharge, that is to say, as the level of the glass in the crucible falls through the ejection of a quantity of it, by the pressure of air, introduced through pipe 49, the valve 5 closes against shoulder 6, and after such pressure is removed, said valve swings open under the pressure of the glass from the furnace and remains open until the glass in the crucible has attained the same level as that of the furnace.

From the above description it will be apparent that I have produced a molten glass feeding mechanism embodying the features of advantage enumerated as desirable and I wish it to be understood that while I have illustrated and described the preferred embodiment of the same, I do not desire to be restricted to the exact details of construction shown and described as obvious modifications within the scope of the appended claims will suggest themselves to one skilled in the art.

I claim:

1. The combination of a crucible for discharging molten glass and a conveyor having ports through which glass from the crucible is adapted to pass; said conveyor having its surface between consecutive ports and adjacent the crucible roughened to insure the carrying off of the glass which issues from the crucible and does not enter the said port.

2. The combination of a crucible for discharging molten glass, and a conveyor having ports, through which glass from the crucible is adapted to pass, said conveyor having its surface between consecutive ports and adjacent to the crucible roughened to insure the carrying off of the glass, which issues from the crucible and does not enter the said ports, and abrasion means for removing glass deposited upon the roughened surface of said conveyor.

3. In a glass operating machine, the combination with a downwardly-discharging crucible, of a conveyor, adjacent to and underlying said crucible, means on said conveyor, near said crucible, forming a relatively long and narrow recess, positioned to receive glass from said crucible and to hold said glass on said conveyor during a transverse movement of said conveyor beneath said crucible, said recess having a port, adapted to pass glass therethrough, flowing from said crucible and means on said conveyor adapted to traverse said port and to sever a stream of glass passing therethrough from said crucible.

4. In a glass operating machine, the combination with a downwardly-discharging crucible, of a conveyor, adjacent to and underlying said crucible, said conveyor being provided with a relatively long and narrow recess, positioned to receive glass from said crucible, there being a port passing through said conveyor communicating with said recess, a cut-off member adapted to traverse said port and to sever glass passing therethrough and means for reciprocating said cut-off member, adapting said member to sever glass on one stroke and to open said port on the reverse stroke.

5. The combination with a downwardly-discharging crucible, of a conveyor positioned to travel across the vertical line of flow of molten glass discharged from said crucible, and having the plane of its path of travel transverse to said vertical line of flow, said conveyor having a port adapted to pass molten glass discharged from said crucible, a cut-off member adapted to sever glass passing through said port and to normally close said port when out of registration with the flow of glass from said crucible, means for moving the conveyor to position said port in registration with said line of flow, and means for reciprocating the said cut-off member.

6. The combination with a downwardly-discharging crucible, of a conveyor positioned to receive and carry glass, discharged from said crucible, in a path whose plane is transverse to the line of flow of glass from said crucible, said conveyor having a port positioned thereon to be registered with the said line of flow, a cut-off member adapted to sever glass flowing through said port, means for reciprocating said member and means adapted to intermittently position a mold to receive glass passing through said port.

7. The combination of a downwardly-discharging crucible, a device having a port through which molten glass can pass from the crucible, a cut-off on said device adapted to traverse said port, means for moving the device to dispose the port and cut-off opposite the discharge point of the crucible, means for withdrawing and readvancing said cut-off during the registration of said port with the said point of discharge, an intermittently movable means adapted to dispose a mold in position to receive the glass which passes through said port, and means to subject the glass in the crucible to pressure to facilitate the discharge through the open end of the crucible while the cut-off is withdrawn.

8. The combination of a molten glass receptacle having a discharge opening, a rotary member positioned below said opening and having a series of ports for receiving molten glass from said opening, means for intermittently rotating said member to register said ports successively with said opening, a cut-off provided for each port, positioned on said member and adapted for normally closing each of said ports while said member is rotating, means acting automatically to operate the cut-off of each port to open the same during the registration of said port with said opening, and compressed-air means operating automatically in time relation with said cut off to force a charge of glass through said discharge opening when said port is open.

9. The combination of a molten glass receptacle having a discharge opening, a rotary member positioned below said opening and having a series of ports for receiving molten glass from said opening, means for intermittently rotating said member to register said ports successively with said opening, a cut-off provided for each port, positioned on said member and adapted for normally closing each of said ports while said member is rotating, means for supplying fluid under pressure to said receptacle and provided with a valve for controlling the same, and means actuated by and in time relation with said cut off and the rotating means for operating the cut-off of each port as registered to open the port when said member is stationary and simultaneously operating said valve for allowing a charge of glass to be forced through said discharge opening.

10. The combination with a crucible having a downwardly-extending discharge spout, of a conveyor underlying said spout, provided with a channel in its upper side and a series of ports leading downward from said channel, means for imparting intermittent movement to the conveyor to successively dispose its ports under said spout, means for supplying fluid under pressure to the crucible, a valve controlling said means, a cut-off for each port carried by the conveyor, means for opening each cut-off as it attains a position below the spout and for closing the cut-off as movement of the conveyor is resumed, means whereby the opening and the closing movements of the cut-off respectively effect opening and closing movements of said valve, and means for disposing and holding a mold under the conveyor and in line with a spout of the crucible and the alined port of the conveyor and moving said mold out of alinement with the said spout as the conveyor moves to withdraw said port and dispose another port below the spout of the crucible.

11. In a glass feeding mechanism, a conduit having a heated discharge outlet, a member having a port-opening and a surface recess communicating with said opening and adapted to receive a flowing stream of glass from said outlet, a shearing device adapted for cutting across said port-opening and to normally close the same, a mold, means for positioning said member to align said port-opening in spaced relation with said outlet, means for positioning said mold in receiving relation with said port opening and said outlet, means for withdrawing said device to open said port opening to permit the passage of glass from said outlet into said mold and to re-advance said device to close said opening and to sever the glass between said outlet and said mold.

12. In a glass feeding mechanism, the combination with a molten glass supply receptacle, having a discharge outlet, of forcing means for intermittently projecting molten glass through said outlet, a plurality of receiving means, means for positioning each of said receiving means in successive registration below said outlet, pending the operation of said forcing means, a traveling member positioned between said outlet and said receiving means, and provided with a plurality of ports transversely disposed to the plane of said member and adapted for successive registration with said outlet in spaced relation thereto and said receiving means, pending the forcible projection of molten glass from said supply receptacle, means for operating the traveling member, closure means co-operating with said ports to successively open and close each port during its registration with said outlet and the receiving means, positioned there below and other means for actuating said closure means, whereby a port in register with said outlet is opened for the free passage of the forcibly projected glass into said receiving means and is closed upon the termination of the action of said forcing means, to sever the projected glass extending through said port and to support the part thereof extending below said outlet and above said port, previous to the registration of successive ports and receiving means, with said outlet.

13. In a glass feeding mechanism, a molten glass passage having a discharge outlet, a member having a port, said port being aligned in spaced relation with said outlet, a shearing device co-operating with said port and adapted to open and close said port, whereby glass passing from said outlet, through said port, is severed and the further passage of glass from said outlet is retarded.

14. In a glass feeding mechanism, a passage for molten glass, said passage having a discharge outlet, a member below said outlet, said member having a port-opening and being positioned to bring said port-opening in alignment with said outlet, a shearing device co-operating with said port-opening, means for actuating said shearing device to open and close said port-opening, the said shearing device, when opened, permitting the passage of molten glass through said port-opening and in closing acting to shear said glass and to form a pocketed extension to said outlet, whereby the movement of said molten glass, extending from said outlet, is arrested by said pocketed extension.

15. In a glass feeding mechanism, the combination with a furnace, of a reservoir, a conduit connecting said reservoir with said furnace, adapted to convey molten glass therefrom, said conduit entering said reservoir below the normal operative levels of molten glass in said reservoir, said reservoir having a discharge outlet, pressure means for exerting pressure upon said molten glass in said reservoir, adapted to intermittently force a limited amount of glass through said outlet, means for obstructing the backward flow of said molten glass, operated by the action of said pressure means, a glass receiving receptacle positioned below said outlet, a member positioned between said outlet and said receptacle, said member having a port and being positioned to have said port in registration with said outlet, means for moving said member, a traversing means adapted to eclipse said port to open or close the same, a plurality of serrations on said member positioned adjacent to said outlet and adjoining said port, said serrations being adapted to receive and hold glass thereon flowing from said outlet during the movement of said member, occurring at the interval between consecutively forced discharges of glass from said outlet and when bringing said port in and out of registration with said outlet, means connected with said pressure means and said member, adapted to co-ordinate the action of said pressure means with said member during the registration of said port with said outlet, means for cooling said member, means for positioning said receiving means in alignment with said outlet during the registration of said member therewith, and means for cleaning glass from said serrations.

16. In mechanism of the class describing the combination with the furnace for supplying molten glass, of a chamber connected with said furnace, said chamber having a discharge outlet, means for exerting pressure upon molten glass held in said chamber to cause the forcible ejection of molten glass from said outlet, a conveyor wheel having a circumferential channel, registered with said outlet and adapted to receive and carry away the unassisted gravity flow of glass from said outlet, a plurality of serrations spaced in said channel, said wheel being positioned to have said channel beneath said outlet, a plurality of ports spaced in said channel, said ports being positioned to register with said outlet upon the turning of said wheel, a cut-off on said wheel, adapted for radial reciprocation across each of said ports, and also adapted for shearing glass passing through said port and to form a closure to said port, for supporting the glass above, a cam member on said wheel adapted to oscillate each of said cut-offs, means to co-ordinate the action of said cam member with that of said means for exerting pressure during the registration of said port with said outlet, means for positioning a glass receiving receptacle below said outlet and maintaining said receptacle thereat during the registration of a port with said outlet, and means for cooling said channel of said wheel.

17. In a device of the character described, the combination of means for causing a constant stream of glass-metal, comprising a glass-metal delivering part, a series of moulds adapted to be successively placed in glass-metal receiving position, directly under said glass-metal delivering part, and means interposed between said glass-metal delivering part, and said series of moulds comprising a glass-metal passage, the entire wall of which is spaced from said stream during passage by gravity from said glass delivering part into the mould in glass-metal receiving position, and comprising a part directing the glass-metal to a point out of range of all the moulds for directing contacted glass-metal away from all moulds.

18. In a device of the character described, the combination of a series of moulds, a glass delivering part for delivering a constant stream of glass-metal by gravity, means for automatically, successively placing said respective moulds under said glass-metal delivering part in glass-metal receiving position and a glass-metal control for cutting off said stream and diverting the same away from all of said moulds for avoiding the passage thereof into any mould of said series of moulds.

19. The combination with a receptacle to contain a supply of molten glass, of a discharging medium into which the glass flows from said receptacle and from which the glass flows continuously, means to give periodic impulses to the glass passing through said medium, and means operating in synchronism with said impulses to periodically sever unformed masses from the flowing glass.

20. The combination with a furnace for molten glass having a discharge orifice adjacent the level of the glass through which the glass is discharged, a passageway along which the glass flows from said orifice and from which passageway the glass is continuously discharged, means for causing a pulsatory movement of the glass along said passageway, and means operating in synchronism with the pulsations of the glass to periodically sever unformed masses from the flowing glass.

21. The combination with a furnace for molten glass having a discharge orifice adjacent the level of the glass through which the glass is discharged, a passageway along which the glass flows from said orifice and from which passageway the glass is continuously discharged, means for causing a pulsatory movement of the glass along said passageway, means operating in synchronism with the pulsations of the glass to periodically sever unformed masses from the flowing glass, and means to heat the glass during its passage through said passageway.

22. The combination with a receptacle to contain molten glass, of a discharging medium providing a laterally extending surface or channel adjacent the level of the glass along which the discharging glass is impelled, and terminating in an orifice through which the glass is continuously discharged downwardly, and means to give periodic impulses to the glass passing through said medium.

23. The combination with a receptacle to contain molten glass, of a discharging medium providing a laterally extending surface or channel adjacent the level of the glass along which the discharging glass is impelled, and terminating in an orifice through which the glass is continuously discharged downwardly, means to give periodic impulses to the glass passing through said medium, and means operating in synchronism with said impulses to periodically sever the descending column of glass at a point below and adjacent to the discharge orifice.

24. The combination with a receptacle to contain molten glass, of a discharging medium providing a laterally extending surface or channel adjacent the level of the glass along which the discharging glass is impelled, and terminating in an orifice through which glass is continuously discharged downwardly, means to give periodic impulses to the glass passing through said medium, means operating in synchronism with said impulses to periodically sever the descending column of glass at a point below and adjacent to the discharge orifice, said discharging medium being in the form of a chamber through which the glass passes, and heating means by which said chamber is kept at a high temperature.

25. The combination with a receptacle for supplying molten glass, of a discharge part for constantly containing and delivering molten glass provided with a downwardly extending channel adjacent the level of the glass in the receptacle along which the glass is caused to pass and continuously discharge downwardly, of means for imparting a pulsatory movement to the glass discharging through said part for the periodic transitional impelled delivery therefrom of unitary quantities, of means operating in synchronism with said movement of the glass at a point below and adjacent to the part for severing unformed portions volumetrically equivalent to respective complete mold charges from the delivering glass, and of a series of glass molding receptacles adapted to be successively brought into position to receive the severed charges.

26. A furnace discharge part for discharging a flow of glass continuously, a carrying mechanism operative outside of the part and carrying shearing means adapted to be intermittently advanced from a lateral position that is spaced from the flowing glass to sever mold charges from the flow at a point adjacent but spaced from the discharge end of the furnace part, means to momentarily cause the consecutive progressive departure from glass severing position of the severing means after each severing and the arrival at such position of said means before each severing of the mold charge, and other means automatically controlled by the movements of the respective means and mechanism for increasing the amount and speed of discharging flow of glass, periodically, before the severance of said mold charges by the shearing means and for causing successive advances of quantities of molten glass from the furnace into the discharge part.

27. The combination with a receptacle to contain molten glass, of a discharge medium provided with a downwardly extending channel adjacent the level of the glass along which the discharging glass is impelled and delivered downwardly, of means to give periodic transitional impulses of motion to the glass passing through said medium to amplify the discharge, and means operating in synchronism with said impulses to periodically sever complete mold charges from such discharge of glass at a point below adjacent and spaced from the discharge medium.

28. The method of feeding glass to molds, which consists in flowing glass from a melting tank into a receptacle, heating said receptacle and accumulating glass therein, providing a circulation of fresh and liquid glass through a discharge opening in the bottom of the receptacle, increasing the volume discharge of the continuously issuing glass by the application of pressure upon the glass in the receptacle and forcing a quick ejection in a mass form of a quantity of glass from the discharge opening thereof, severing off the ejecting mass at the termination of the pressure action and depositing the mass of glass in a mold, removing the continuously flowing glass issuing from the discharge opening in a direction different from that of the ejected glass, and terminating such removal during the pressure action and forced ejection of glass from the discharge opening.

29. The method of providing an instantaneous quantity charge of glass for molds, which consists in flowing glass from the upper levels in a melting tank along a conduit leading diagonally downward and terminating in a cylindrical open-ended and vertically disposed outlet, flowing said glass into said outlet, intermittently applying and communicating fluid pressure to the glass in said outlet and projecting a rounded mass of glass therefrom, fixing the dimensions of the projecting glass by the diameter of the outlet opening and the duration and magnitude of the pressure action applied to the glass in said outlet, simultaneously terminating the pressure action and the projection of glass from the outlet by the operation of transverse shearing instrumentality across the projecting mass of glass and receiving the severed off quantity of glass within the confines of a mold.

30. In a glass manufacturing the method which consists in advancing molten glass through a heated passage, flowing the glass from said passage, and dividing the same alternatively into vertically descending mold charges and transversely moving discarded portions.

31. The method of obtaining mold charges, which consists in effecting a variable constant forwarding of molten glass from a heated outlet part in a manner to intermittently produce an outflow of glass outside of said part that is entirely free and unsupported, and forming successive detached freely falling mold charges from such outflow in conformity with the periodic forwarding thereof and at a point outside of the outlet that is spaced therefrom.

32. In glass manufacturing, the method which consists in intermittently emitting a voluminous freely vertically descending discharge of fluent glass from a flow spout, successively associating shearing means with said glass while in transit beyond said spout and cutting off quantities therefrom without previously affording under support for said quantities with said shearing means, receiving each cut-off quantity in a mold that is awaiting the same, and periodically in between such emitting of glass, and immediately after each cutting thereof effecting a limited discharging movement of glass in said spout and delivering heat to the glass that is in said spout.

33. The method in glass manufacture, which consists in periodically passing a quantity of molten glass that is sufficient for a mold charge from a body of glass that is in constant motion through a reservoir, heating the glass where it is passing out from said reservoir, forming detached integral mold charges from said glass while passing outside of the reservoir and enforcing a condition of consistent fluidity upon the glass that is so passing.

34. The process of obtaining mold charges from a glass melting tank comprising passing the glass in a continuous stream from the tank to a discharge orifice below the level of the glass in the tank without contacting the interior of the stream with any foreign substance, allowing a continuous discharge of periodically increasing and decreasing velocity from the orifice, and severing a mold charge from the glass issuing during each period of increased discharge.

35. In glass manufacture, the process comprising passing glass from a melting tank in a continuous stream to a discharge orifice below the level of the glass in the tank without contacting the interior of the stream with any foreign substance, presenting receptacles successively at spaced intervals to the orifice, allowing unrestricted discharge of glass into each receptacle as presented, and allowing a restrained discharge continuously between presentations of receptacles.

36. The method which consists in causing molten glass to issue from a source of supply, periodically cutting off mold charges from the issuing glass with cutting devices, and causing after each cutting operation, a continued issuance of glass and movement of the issuing glass and cutting device in the same general direction.

37. In the forming of molten glass into mold charges, the method which consists in causing a continuous flow of glass through a flow spout and increasing the rate of glass discharge through the flow spout by the application of expelling force to the glass therein after a mold is disposed therebeneath and causing a sustained progressively increased glass discharge from the spout, in cutting off the glass thus accumulated beneath the spout, and in arresting the operation of the expelling force prior to the completed cutting action.

38. In the forming of molten glass into mold charges, the method which consists in causing a continuous downward flow of molten glass through a discharge orifice and applying ejecting force to the glass which is in discharging transit through the orifice and thereby causing the glass in transit to move out from the orifice at a speedier ratio than the prior glass discharge therefrom, in forming a projecting body of molten glass beneath the orifice by this method of discharging, and severing this body to form the mold charge.

In testimony whereof I affix my signature.

ENOCH T. FERNGREN.